United States Patent [19]
Yan

[11] Patent Number: 4,938,936
[45] Date of Patent: Jul. 3, 1990

[54] HYDROGEN FLUORIDE VAPOR CONTAINMENT AND NEUTRALIZATION

[75] Inventor: Tsoung Y. Yan, Philadelphia, Pa.

[73] Assignee: Mobil Oil Corporation, New York, N.Y.

[21] Appl. No.: 239,256

[22] Filed: Sep. 1, 1988

[51] Int. Cl.$^5$ ............................................. B08B 3/08
[52] U.S. Cl. ................................... 423/240; 423/483; 585/725; 585/724; 585/854; 134/42
[58] Field of Search ............... 423/240, 483; 585/725, 585/724, 723, 853, 854; 134/42

[56] References Cited

U.S. PATENT DOCUMENTS 4,210,460  7/1980  Seidenberger ........................ 134/7
4,409,420  10/1983  VanPool ............................. 423/240
4,552,624  11/1985  Clarkson ........................... 204/1 T

OTHER PUBLICATIONS

Howley, "Condensed Chemical Dictionary", 9th Ed. (1977) Van Nostrand Reinhold, p. 25.

Primary Examiner—Asok Pal
Attorney, Agent, or Firm—Alexander J. McKillop; Charles J. Speciale; Malcolm D. Keen

[57] ABSTRACT

A method of containing and neutralizing a hydrofluoric acid spill which comprises the steps of detecting a hydrofluoric acid spill, and then drenching the hydrofluoric acid spill area with a drench composition comprising water, and an alkali agent, or water an alkali agent and a surfactant, or water an alkali agent, a surfactant and a foaming agent. The alkali agents are present in an amount of 0.1 to 10 parts per 100 parts of water.

10 Claims, 1 Drawing Sheet

U.S. Patent    Jul. 3, 1990    4,938,936
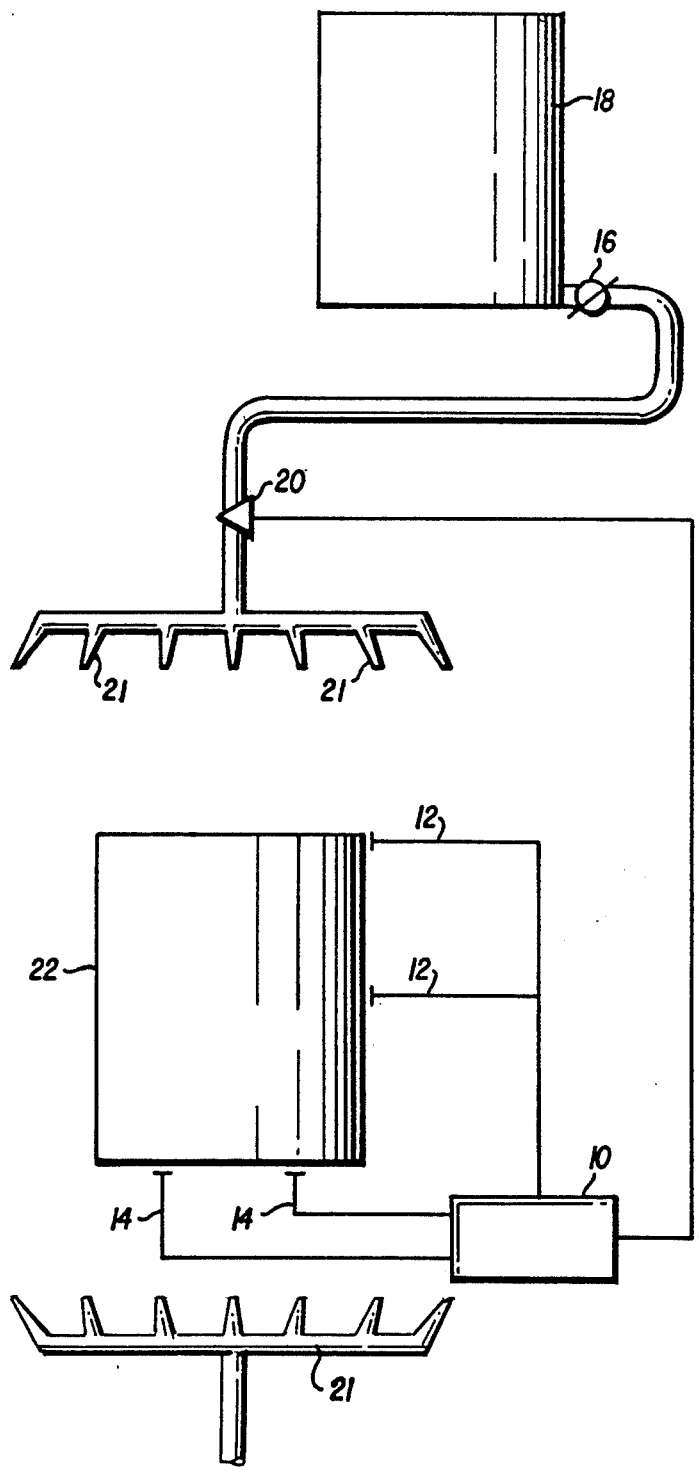

HYDROGEN FLUORIDE VAPOR CONTAINMENT AND NEUTRALIZATION

FIELD OF THE INVENTION

This invention relates to a method and apparatus for the containment and neutralization of a hydrogen fluoride vapor cloud.

BACKGROUND OF THE INVENTION

Hydrogen fluoride, or hydrofluoric acid (HF) is toxic and corrosive. Hydrofluoric acid in gaseous vapor or liquid form attacks the skin and will, on contact, cause ulceration of mucous membranes, and possibly chemical pneumonia to those exposed to it. Hydrofluoric acid is, however, an industrially important chemical. It is used to manufacture fluorine and to prepare fluorides and other chemical compounds. It is also used as a catalyst in isomerization, condensation, polymerization and hydrolysis reactions.

The petroleum industry uses anhydrous hydrogen fluoride primarily as a liquid catalyst for the alkylation of olefinic hydrocarbons to produce alkylate for increasing the octane number of gasoline. It is estimated that the U.S. petroleum alkylation industry uses 5% of the HF produced in the U.S. Its importance and acceptance is evidenced by the fact that in 1978 U.S. refiners scheduled eight new HF alkylation plants with a total capacity of 7,950 $m^3$ (50,000 barrels) of alkylate per day. The total U.S. HF alkylation capacity in 1984 was 69,160 $m^3$ (435,000 barrels) per day, and 0.43 to 1.0 kg of HF were used per cubic meter of alkylate.

Years of experience in its manufacture and use have shown that HF can be handled safely, provided the hazards are recognized and precautions taken. Though many safety precautions are taken to prevent leaks, massive or catastrophic leaks are feared primarily because the anhydrous acid will fume on escape creating a vapor cloud that can be spread for some distance.

A number of qualitative methods have been proposed for treating HF spills. The most common method is the use of a simple water drench system. Kirk-Othmer: Encyclopedia of Chemical Technology, 3rd Edition, Volume 1, page 655 reports that "water, the most common absorption liquid is used for removing acidic gases...especially if the last contact is with water of alkaline pH". However, because of the aerosol nature of the HF cloud, i.e., the HF droplets in such a cloud are very small compared to the droplets of water in a simple water drench, the water drench generally cannot remove all the HF present in the cloud.

U.S. Pat. No., 4,210,460 relates to treating an HF liquid spill by applying to the spill a quantity of an aqueous solution of calcium acetate equal to at least seven times the estimated volume of the spill, and thereafter treating the spill with powdered magnesium oxide. The mixture is tested using a PH indicator such as bromothymol blue. After the mixture reaches a persistent blue color, indicating a safe state, the spill is cleaned up mechanically.

At the 1982 Hazardous Material Spills Conference, Edward C. Norman of National Foam System Inc. reported the application of limestone and then CHF-784 foam (a proprietary composition) to the contents of a damaged tank emitting an HF cloud. An immediate reduction in fume evolution was apparent after the foam application.

Gordon K. Braley, at the proceedings of the 1980 National Conference on Control of Hazardous Material Spills, in Louisville, Kentucky on May 15, 1980 reported the treatment of relatively small amounts of controlled liquid spills of anhydrous hydrogen fluoride with high molecular weight polymers including polyacrylamide, polymethyl methacrylate, and polyvinyl alcohol. These materials applied in the form of a bead polymer formed a "skin" over the spill preventing fuming of the liquid. Polyacrylamide was deemed the most effective skin-forming agent.

Of the art cited above, only Edward C. Norman discusses an alleged successful treatment of a cloud containing HF. However, the composition used to treat such a cloud is not disclosed to the public.

The present invention was devised to provide an effective method and apparatus for containing and neutralizing an HF cloud.

SUMMARY OF THE INVENTION

The invention relates to a method and an apparatus for containment and neutralization of HF escaping from sources such as alkylation units located at alkylating refineries. In the method an HF drench composition which in a preferred embodiment is composed of water, alkali base, surfactants, and a foaming agent, is applied to escaping HF as a drench. The method includes the use of HF detectors positioned strategically about the alkylation unit. Upon detection of HF leakage, the drench composition composed of water, the alkali agent, the surfactant and the foaming agent is released and the escaping HF is contained and neutralized.

BRIEF DESCRIPTION OF THE DRAWINGS

FIG. 1 is a schematic drawing of the apparatus used to practice the present invention.

DETAILED DESCRIPTION OF THE INVENTION

An HF-alkylation acid composition is composed of about 88% HF, 6.5% acid-soluble oils, 4% $C_3/C_4$ alkylate and 1.5% water. When such a composition escapes, or is accidentally released to the atmosphere, in large amounts from an alkylating unit an aerosol cloud will form instantaneously. It is estimated that the cloud will be made up of about 70 to 88% of HF aerosol droplets of a size in the range of 0.5 to 5.0$\mu$. The hydrocarbon component of this composition will hamper the ability to contain and neutralize such an aerosol cloud because a good portion of the HF droplets will be trapped by the hydrocarbons. The qualitative drenching of the HF cloud by the method of this invention will ensure that even the trapped HF droplets can be contained and neutralized. The method involves the detection of escaping HF, and then release of a two, three or four-component drench to contain and neutralize the escaping HF.

The first step of the first embodiment of the method requires the detection of escaping HF. Because a vapor cloud will form instantaneously, when HF is released from an alkylating unit to the atmosphere, the presence of HF should be detected as quickly as possible. To ensure early detection, primary HF detectors are located in areas where such a leak is most likely to develop. At a minimum the HF detectors are placed about the top periphery of the storage tank or tower containing the alkylation acid and about a mid-portion of such a storage facility The detectors are also located at weld seams, pipe connections, valve connections and generally along pipes and joints of the conduit system used for transporting the HF-alkylation acid to the alkylating reactor.

The primary HF detectors detect the presence of HF in amounts of at least 20 ppm which is an amount determined by the National Institute of Occupational Safety and Health to be "immediately dangerous to life and health" if one is exposed to such a concentration for 30 minutes. As little as 50 ppm is deemed to be a lethal dose.

HF detectors, such as the devices disclosed and claimed in U.S. Pat. No. 4,552,624, herein incorporated by reference, can be used as primary detectors in the method of the invention to detect an HF leak.

Although it is possible that the primary HF detectors could monitor an initial HF leak and transmit such data to a computer which then activates the drenching steps of the invention, additional electro-mechanical devices, as secondary detectors, are used in combination with the primary HF detectors to determine and verify that a massive leak (i.e., a leak which could spread beyond the confines of the alkylation unit), is occurring. The secondary detectors monitor the temperature of the walls of the alkylation unit and the pressure within the unit and feed lines. A sudden large-scale change in monitored parameters will indicate a massive leak.

The apparatus used in the invention will now be described with reference to in FIG. 1. A computer 10 oversees the collection of the data from primary HF detectors 12 and secondary detectors 14, and when the accumulated data indicates that a massive leak is taking place, such as by pressure and temperature changes, which are associated with such a leak, computer 10 will activate a drenching step, releasing the drench, and control the timing of the drench. Such a primary/secondary detection means prevents false alarms, and may save hundreds of thousands of gallons of drench solution.

Once a massive leak has been detected, the computer 10 activates the drenching step. As seen in FIG. 1, in a first step, the computer opens valve 16 and the drench composition in storage tank 18, or other supply vessel, is pumped by pump 20 at a rate of about 1,000 to 11,000 gals/min to spray nozzles 21 located above, and/or below, and surrounding, for example, the alkylation-acid storage unit 22 from which the leak is occurring. Nozzles such as air-aspirating foam nozzles are preferred although other foam generating nozzles or devices may be used.

As noted above, the drench composition is preferably formed of four components; water, an alkali agent, a surfactant and a foaming agent. The composition, however, can be composed of water and an alkali agent only, or water an alkali agent and a surfactant or mixtures of surfactants. The multiple components of the drench can be stored separately, or together. To assure efficient operation, the components are pre-mixed and stored in tank 18. If stored separately, the components may be mixed in a header forming a common delivery point for the components. Whether mixed in a mixing header prior to release, or delivered from a common storage tank, the components are used in admixture in a single drench to contain and neutralize a cloud containing HF vapor. Preferably the multiple components are stored together in a pre-mixed state in tank 18.

The alkali agent of the drench is composed of an alkali base such as $NaHCO_3$, $Na_2CO_3$, $K_2CO_3$, $KHCO_3$, NaOH, KOH and the naturally occurring mineral $Na_2CO_3/NaHCO_3$ or mixtures thereof. The carbonates are preferred alkali agents, and the naturally occurring mineral $Na_2CO_3/NaHCO_3$ is a most preferred alkali agent. These agents should be present in the water component in amounts of between about 0.1 to 10 parts per 100 parts of water; and preferably 1 to 5 parts per 100 parts of water.

The alkali agents raise the pH of the vapor cloud by reacting with HF to form harmless NaF or KF solids. When the alkali containing carbonates are used NaF and KF are produced along with $CO_2$ gas. The $CO_2$ gas becomes incorporated into the vapor cloud diluting the concentration of the HF present therein. The $CO_2$ gas also promotes contact between the HF droplets and the drenching solution to improve its effectiveness. The $CO_2$ formed from the carbonates upon neutralization is particularly helpful in producing foam to contain the escaping HF.

The surfactant is used to reduce the friction of the water, to improve its flow and, more importantly, to wet the HF aerosol to promote contact and reaction between HF and the alkali agent. Suitable surfactants, for use in the method of the invention, include anionic, cationic and non-ionic surfactants. A single surfactant or a mixture of surfactants can be used. Although the non-ionic surfactants are particularly preferred, because they perform the wetting function more efficiently, alkylbenzyl sulfonates, such as dodecyl benzene sulfonate can also be used. Of the sulfonates, petroleum solfonate is particularly preferred because of its low cost. The alkyl chain length in such surfactants is between $C_8$–$C_{30}$ and preferably between $C_{10}$–$C_{20}$. Suitable specific surfactants include those disclosed in Kirk-Othmer: Encyclopedia of Chemical Technology, 3rd Edition, Volume 22, pages 332–386 which is herein incorporated by reference. The surfactants are used in the range of 10 to 10,000 ppm, preferable their concentration is between 100 to 1,000 ppm based on the water content.

The fourth component is a liquid foam-forming agent which retards HF escape and improves HF/solution contact by providing a large surface area so as to minimize the solution requirement. Suitable foams for use in the invention include protein foam and synthetic foam.

Protein-foam concentrate is produced by hydrolyzing naturally occurring proteinaceous materials, e.g., fish meal, feather meal, and horn and hoof meal. In a typical process, the meal is cooked in an alkaline solution and then neutralized with acid and filtered. A stabilizer and other additives are blended in a large tank and run through a final filter and packaged. Protein-foam concentrate is made in 3% and 6% concentrates. The synthetic foams are composed of the surfacants discussed above.

As discussed and schematically shown in FIG. 1, on the detection of a massive spill or leak of HF, the preferred four-component drench is released in sufficient amounts, of about 1,000 to 11,0000 gal/min, and applied to the HF vapor cloud reducing the risk of the spread of the vapor cloud.

In a second embodiment of the method (not shown) separate vacuum or aspirating pipes are connected to tank 18 which contains a concentrated composition of the four-component drench. The aspirating pipes are connected at their second ends to a water supply line. The water supply line is connected at one end to a water supply, and at a second end to nozzles 21. The flow rate of the water passing through the supply line is regulated, and the concentrated drench is sucked into the supply line and diluted to desired concentration before passing from the water supply line to nozzles 21. Using a concentrated drench solution, of course, allows for greater drench storage capacity. The opening of the vacuum lines, and timing of their opening are controlled by the computer.

Alternatively the drench may be composed of only two components or of only three components. For instance, the drench may be composed of only water and alkali agents, or of water, alkali agents and surfactants, or of water, alkali agents and foaming agents. The components of a two-component drench or three-component drench are also preferably contained in a single storage tank such as tank 18.

Various spray patterns can be used to contain and neutralize the forming vapor cloud in the methods of embodiments one and two. For example, nozzles are positioned in concentric rings about areas where possible HF-leaks will form. When activated, these positioned nozzles will deliver the two, three or a four-component drench as a plurality of spray curtains which will contain the HF cloud more effectively. A ring or rings of nozzles may be positioned at different heights relative to other rings. Of course, a single ring of spray nozzles can be used to form a single spray curtain. Alternatively, the nozzles may be aligned in parallel rows or in other patterns. The nozzles can also be directed, by electrical signals received from the computer, so that a stream of water is directed at the leak. Such a stream pattern is similar to patterns used to fight a fire. Alternatively, and as shown in FIG. 1, nozzles can be positioned so that upflow as well as downflow drench curtains are formed in containing HF.

In the method of embodiment two, the concentrated drench solution may be sprayed directly onto the source of the HF leak.

Although the invention has been described above with reference to specific embodiments, it should be apparent that changes and modifications may be made without departing from the spirit and scope of the invention. Accordingly, the invention is not limited by the foregoing description, but is only limited by the scope of the appended claims.

What is claimed:

1. A method for the containment and neutralization of a vaporous cloud containing hydrofluoric acid which comprises; drenching said vaporous cloud with a drench composition comprising:
    (a) water, and
    (b) an alkali agent, wherein said alkali agent is selected from the group consisting of $NaHCO_3$, $Na_2CO_3$, $K_2CO_3$, $KHCO_3$, and naturally occurring mineral $Na_2CO_3/NaHCO_3$, and mixtures thereof, in amounts of between about 0.1 to 10 parts, per 100 parts of water.

2. The method of claim 1 wherein the drench composition further comprises a surfactant or a mixture of surfactants.

3. The method of claim 1 wherein the drench composition further comprises a foaming agent or a mixture of foaming agents.

4. The method according to claim 1 wherein said alkali agent is $Na_2CO_3/NaHCO_3$.

5. The method according to claim 1 wherein said method further comprises detecting a hydrofluoric acid leak and initiating said drenching step upon such detection.

6. The method according to claim 3 wherein said foaming agents are selected from the group consisting of, protein foams, and synthetic foams.

7. The method according to claim 2 wherein said surfactant is present in amounts of between about 100 to 1,000 ppm based on the water content.

8. The method of claim 5 wherein drenching of said vaporous cloud is performed by a plurality of spray curtains.

9. A method for the containment and neutralization of a vaporous cloud containing hydrofluoric acid which comprises; detecting a hydrofluoric acid leak, and then drenching said vaporous cloud with a drench composition comprising:
    (a) water,
    (b) an alkali agent,
    (c) a surfactant, and
    (d) a foaming agent,
wherein said alkali agent is selected from the group consisting of $NaHCO_3$, $Na_2CO_3$, $K_2CO_3$, $KHCO_3$, $NaOH$, $KOH$ and the naturally occurring mineral $Na_2CO_3/NaHCO_3$, and mixtures thereof, in amounts of between about 0.1 to 10 parts, per 100 parts of water.

10. The method of claim 9 wherein said drench composition is a concentrated composition of components (b), (c) and (d) which is diluted with water during said drenching step.

* * * * *